US009258427B2

(12) United States Patent
Rahman

(10) Patent No.: US 9,258,427 B2
(45) Date of Patent: Feb. 9, 2016

(54) SYSTEM AND METHOD FOR FORWARDING CALLS

(75) Inventor: Moshiur Rahman, Marlboro, NJ (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 2085 days.

(21) Appl. No.: 11/736,693

(22) Filed: Apr. 18, 2007

(65) Prior Publication Data
US 2008/0260136 A1 Oct. 23, 2008

(51) Int. Cl.
H04M 3/42 (2006.01)
G06F 17/30 (2006.01)
G06F 12/00 (2006.01)
H04W 4/00 (2009.01)
G06F 12/08 (2006.01)
H04M 3/54 (2006.01)
H04W 4/16 (2009.01)
H04L 29/06 (2006.01)

(52) U.S. Cl.
CPC ............ *H04M 3/54* (2013.01); *H04L 65/1069* (2013.01); *H04W 4/16* (2013.01); *H04L 65/1016* (2013.01)

(58) Field of Classification Search
CPC ............ H04L 65/1016; H04L 61/1594; H04L 67/306
See application file for complete search history.

(56) References Cited

U.S. PATENT DOCUMENTS

| 6,931,254 | B1 * | 8/2005 | Egner | G06Q 30/0269 455/456.1 |
| 2004/0203766 | A1 * | 10/2004 | Jenniges et al. | 455/435.1 |
| 2004/0223605 | A1 * | 11/2004 | Donnelly | 379/373.01 |
| 2005/0041793 | A1 * | 2/2005 | Fulton et al. | 379/211.01 |
| 2005/0078642 | A1 * | 4/2005 | Mayer et al. | 370/338 |
| 2006/0034441 | A1 * | 2/2006 | Kraft | H04M 1/575 379/142.01 |
| 2007/0121584 | A1 * | 5/2007 | Qiu et al. | 370/352 |
| 2007/0140150 | A1 * | 6/2007 | Beck et al. | 370/279 |
| 2007/0280464 | A1 * | 12/2007 | Hughes et al. | 379/205.01 |
| 2008/0056462 | A1 * | 3/2008 | Pounds et al. | 379/88.17 |
| 2009/0235299 | A1 * | 9/2009 | Astrom et al. | 725/25 |

FOREIGN PATENT DOCUMENTS

WO 2006125474 11/2006

OTHER PUBLICATIONS

Tigerdirect.ca, "Power-Up LCD SIM Card Reader". http://www.tigerdirect.ca/applications/searchtools/item-Details.asp?EdpNo=1779578&sku=GEN-5002, website last visited on Apr. 13, 2007.
Withandwithoutwires.com, "Jaytech Sim Card Data Protector". http://www.withandwithoutwires.com/jaytech-sim-card-data-protector.html, website last visited on Apr. 13, 2007.

* cited by examiner

Primary Examiner — Asad Nawaz
Assistant Examiner — Jason Harley
(74) Attorney, Agent, or Firm — Guntin & Gust, PLC; Jay H. Anderson

(57) ABSTRACT

A system and method for forwarding calls is disclosed. A system that incorporates teachings of the present disclosure may include, for example, a communication device having a controller element to receive a call from a communication system, retrieve a caller ID from information associated with the call, present a caller ID, receive a request to forward the call, present one or more communication identifiers responsive to the forwarding request, receive a selection corresponding to one of the one or more communication identifiers, and submit to the communication system a request to forward the call to the selected communication identifier. Additional embodiments are disclosed.

16 Claims, 4 Drawing Sheets

100

200

Communication Devices 116

SYSTEM AND METHOD FOR FORWARDING CALLS

FIELD OF THE DISCLOSURE

The present disclosure relates generally to communication systems, and more specifically to a system and method for forwarding calls.

BACKGROUND

In multiparty households or offices that share a single phone number, it is common for someone in the premise to receive a call directed to someone else who is not at the premises at the time. Typically when this happens the receiving party either records a message or tells the called party how to go about reaching the intended party. Although this approach is helpful to the calling party, it can be undesirable for others in the household or office to answer calls unintended for them.

A need therefore arises for a system and method for forwarding calls.

DETAILED DESCRIPTION

Embodiments in accordance with the present disclosure provide a system and method for forwarding calls.

In a first embodiment of the present disclosure, a communication device can have a controller element to receive a call from a communication system, retrieve a caller ID from information associated with the call, present a caller ID, receive a request to forward the call, presents one or more communication identifiers responsive to the forwarding request, receive a selection corresponding to one of the one or more communication identifiers, and submit to the communication system a request to forward the call to the selected communication identifier.

In a second embodiment of the present disclosure, a network element in an IP Multimedia Subsystem (IMS) communication system can have a controller element that notifies a communication device of an incoming call, supplies a caller ID associated with the incoming call, and receives from the communication device a request to forward the call to a selected communication identifier.

In a third embodiment of the present disclosure, a method can involve receiving a call from a communication system, presenting a caller ID associated with the call, and submitting to the communication system a request for the call to be forwarded.

Figure 1:
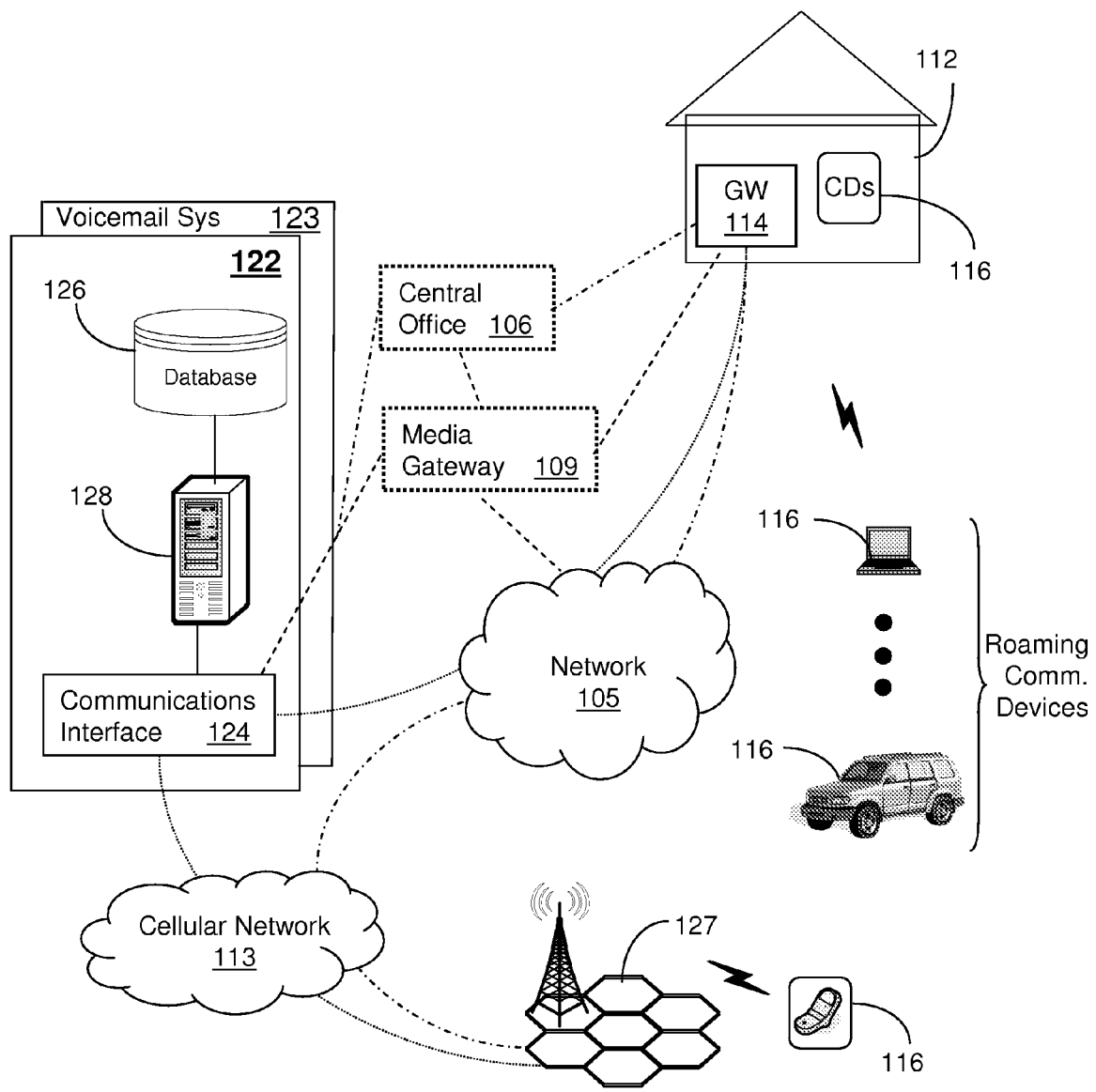
FIGS. 1 and 2 depict exemplary embodiments of a communication system.

FIG. 1 depicts an exemplary block diagram of a communication system 100 that can supply voice services to one or more fixed and roaming communication devices 116. The communication system 100 can comprise a central office (CO) 106 coupled to one or more buildings 112. The CO 106 can house common network switching equipment (e.g., circuit-switched and packet-switched switches and routers) for distributing local and long-distance telecommunication services supplied by network 105 to buildings 112 (such as dwellings or commercial enterprises). For illustration purposes only, buildings 112 can be referred to herein as residences 112. However, it should be understood by one of ordinary skill in the art that the buildings 112 can refer to any premises or areas that utilize communication services. Telecommunication services of the CO 106 can include traditional POTS (Plain Old Telephone Service) and broadband services such as HDTV, DSL, VoIP (Voice over Internet Protocol), IPTV (Internet Protocol Television), Internet services, and so on. The communication devices 116 can be a portable or fixed VoIP, PSTN, and/or cellular terminal. However, the present disclosure contemplates the use of other types of communication devices, including other types of voice, video and data devices.

As a packet-switched network, network 105 can represent an Internet Service Provider (ISP) network. The network 105 can be coupled to a network proxy 122, a cellular network 113 and network elements located in one or more of the buildings 112. As a circuit-switched network, network 105, can provide PSTN services to fixed communication devices 116. In a combined embodiment, network 105 can utilize technology for transporting Internet, voice, and video traffic.

In an enterprise setting, the building 112 can include a gateway 114 that provides voice and/or video connectivity services between communication devices 116, such as VoIP terminals or other forms of communication devices of enterprise personnel. In a residential setting, the building 112 can include a gateway 114 represented by, for example, a residential gateway coupled to central office 106 utilizing conventional telephonic switching for processing calls with third parties.

The network proxy 122 can be used to control operations of a media gateway 109, the central office 106 and the gateway 114. Communications between the network proxy 122, the communication devices 116 and other network elements of the communication system 100 can conform to any number of signaling protocols such as a session initiation protocol (SIP), or a video communications protocol such as H.323 which combines video and voice over a packet-switched network.

The network proxy 122 can comprise a communications interface 124 that utilizes common technology for communicating over an IP interface with the network 105, the media gateway 109, the cellular network 113, and/or the gateway 114. By way of the communications interface 124, the network proxy 122 can direct by common means any of the foregoing network elements to establish packet switched data, voice, and/or video connections between communication devices 116 distributed throughout the communication system 100. The network proxy 122 can further comprise a memory 126 (such as a high capacity storage medium) embodied in this illustration as a database, and a controller 128 that makes use of computing technology such as a desktop computer, or scalable server for controlling operations of the network proxy 122. The network proxy 122 can operate as an IP Multimedia Subsystem (IMS) conforming in part to protocols defined by standards bodies such as 3GPP (Third Generation Partnership Protocol).

Under the control of the network proxy 122, the media gateway 109 can link packet-switched and circuit-switched technologies such as the cellular network 113 (or central office 106) and the network 105, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The cellular network 113 can support voice and data services over a number of access technologies such as GSM-GPRS, EDGE, CDMA-1X, UMTS, WiMAX, software defined radio (SDR), and other known and future technologies. The cellular network 113 can be coupled to base stations 127 under a frequency-reuse plan for communicating over-the-air with roaming VoIP terminals 116.

Controller 128 of the network proxy 122 can include a message processing system or sub-system which can be utilized to direct calls to a common voicemail system 123 to record by common means callback messages. The message processing system can redirect calls to the voicemail system 123 when it detects a calling party is unable to communicate directly with a called party. The callback message supplied by a calling party to the voicemail system 123 can represent a caller ID retrieved from a call initiated by the calling party over the communication network 100 utilizing common means, and/or a voicemail message supplied thereby.

The voicemail system 123 can include technology such as found in an interactive voice response system (IVR) for interacting with the calling and called parties utilizing voice and keyed input signals (e.g., DTMF tones), and for processing a callback message supplied by the calling party according to a particular call flow design. The voicemail system 123 can support subscribers who are interested in storing callback messages such as a recorded voice message. The message processing system of the network proxy 122 can be provisioned to interact cooperatively with the voicemail system 123 to enhance processing of callback messages. The present disclosure contemplates the voicemail system 123 being a separate control system or systems in communication with the network proxy 122.

Figure 2:
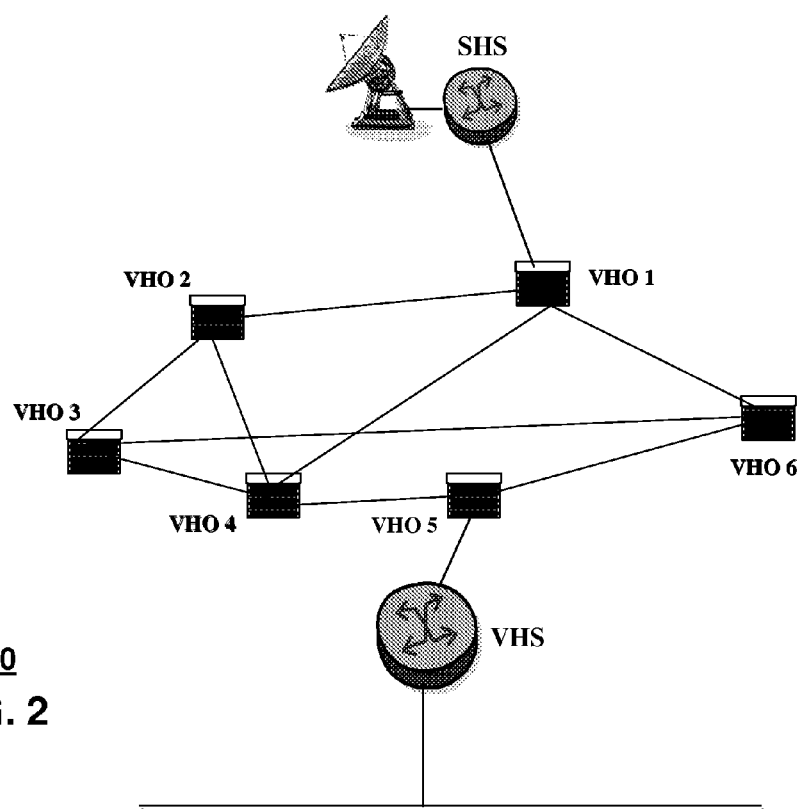
Figure 2:
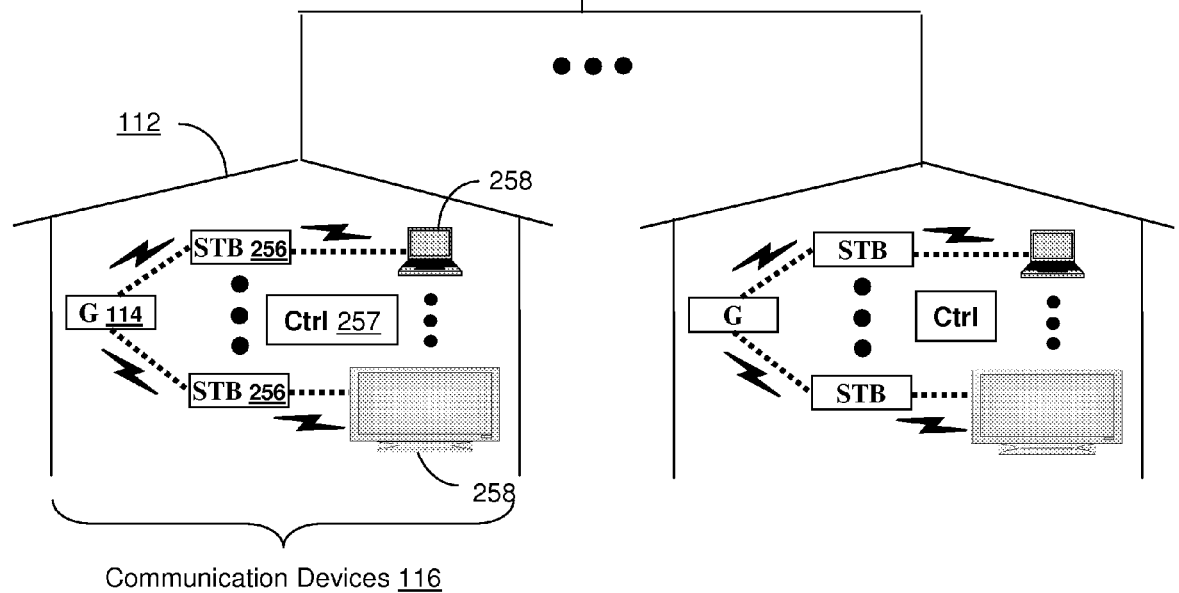

FIG. 2 depicts an exemplary embodiment of a communication system 200 embodying an IPTV service. Communication system 200 can be overlaid or operably coupled with communication system 100 as another representative embodiment of communication system 100. In a typical IPTV backbone, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 112 housing the gateway 114 (e.g., a residential gateway or RG) that distributes broadcast signals to receivers such as Set-Top Boxes (STBs) 256 which in turn present broadcast selections or media programs to media devices 258 such as computers or television units managed in some instances by a media controller 257 (e.g., an infrared or RF remote control).

Unicast traffic can also be exchanged between the STBs 256 and the subsystems of the IPTV communication system 200 for services such as video-on-demand (VoD). Although not shown, the aforementioned multimedia system can also be combined with analog broadcast distributions systems.

Figure 3:
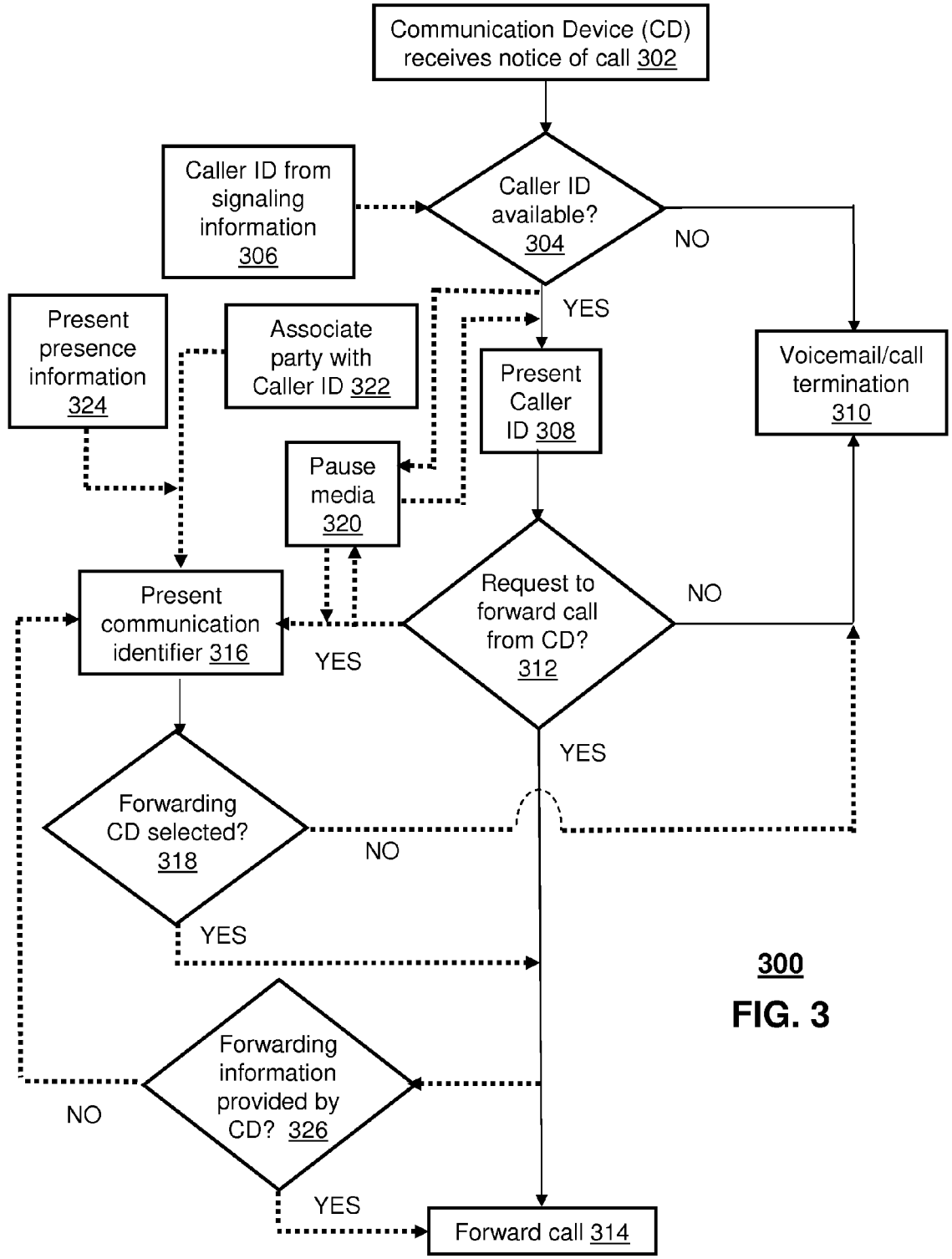
FIG. 3 depicts an exemplary method operating in one or more of the communication systems of FIGS. 1 and 2.

FIG. 3 depicts an exemplary method 300 operating in portions of communication systems 100 and/or 200. Method 300 can begin with step 302 in which a calling party initiates a call to a fixed or roaming communication device 116 of a called party, and the communication device 116 receives notification of the incoming call. The communication device 116 can be various types of devices, including a fixed device (e.g., a residential telephone), a short-range portable device (e.g., a DECT or PHS cordless phone, Bluetooth or WiFi device), a cellular device, a set-top box, and a computer, and can provide single or multimedia services, including data (e.g., Internet), voice (PSTN or VoIP), and/or video services (e.g., IPTV, VoIP with video, etc.) as discussed earlier. The calling party can utilize a communication device similar or different to the communication device 116 of the called party (e.g., a cell phone, PSTN phone, VoIP phone, etc.) to initiate the call.

The incoming call can be detected by the network proxy 122 and a determination of availability of a caller ID for the calling party's communication device can be made in step 304. The call can be detected by the network proxy 122 through analysis of signaling information such as SIP or SS7 associated with the detected call. In one embodiment, signaling information can comprise the caller ID (e.g., an E.164 number, SIP URI, Tel URI, etc.) of the calling party's communication device which can also be detected by the network proxy 122, as in step 306.

If a caller ID is available for the calling party's communication device, the network proxy 122 can present the caller ID to the called party's communication device 116, in step 308. Based at least in part on the caller ID, a user of the called party's communication device 116 can decide whether or not to forward the incoming call to another fixed or roaming communication device. If on the other hand the network proxy 122 detects that a caller ID is not available for the called party's communication device 116, then the network proxy can proceed to step 310 where the incoming call can remain directed to the current communication device 116, can be redirected to a voicemail system 123 associated with the current communication device or can be disposed of otherwise.

In step 312, the network proxy 122 can determine whether a request to forward the incoming call has been made by a user at the called party's communication device 116. If the called party's communication device 116 has made the call forwarding request for this incoming call, then in step 314 the network proxy 122 redirects the call to the desired other communication device of the called party. If on the other hand the network proxy 122 detects in step 312 that the called party's communication device 116 has not made a forwarding request, then the network proxy can maintain the incoming call directed to the current communication device 116, can redirect the call to a voicemail system 123 associated with the current communication device or can dispose of the call otherwise, as previously recited in step 310.

In one embodiment, one or more communication identifiers are presented to the user of the called party's communication device 116 in response to a call forwarding request, as in step 316. The communication identifiers can assist the user in determining where to forward the incoming call, e.g., another communication device of the called party which is likely to be answered by the called party. In one embodiment, the communication identifiers can be a list of forwarding numbers or communication devices associated with the called party that can be selected by the user for forwarding the incoming call. In step 318, the network proxy 122 can determine whether a forwarding selection for another communication device of the called party has been made by the user and forward the call accordingly. The forwarding selection can be made based upon the one or more communication identifiers presented, and can also be made based upon other factors, as well as being inputted into the called party's communication device 116 by the user, such as where a user may be aware of the presence of the called party in proximity to some other communication device that is not included in the list of communication identifiers and may not even be associated with the called party. If on the other hand the network proxy 122 detects in step 318 that a forwarding communication device has not been selected by the user, then the network proxy can maintain the incoming call directed to the current communication device 116, can redirect the call to a voice-mail system 123 associated with the current communication device or can dispose of the call otherwise, as previously recited in step 310.

In one embodiment, where the called party's communication device 116 is a media device receiving a media program, such as from the IPTV system coupled to the IMS system as described above, the media program can be paused and/or recorded so that the caller ID and/or the communication identifiers can be presented at the media device and the media program subsequently resumed, as in step 320. The technique for presentation at the media device can vary, and can include a partial pop-up, total replacement or semi-transparent overlay of the viewing area, as well as audio presentations.

The present disclosure contemplates the presentation of the caller ID, the communication identifiers and/or the notification of incoming call being adjustable by the user to select from any of the techniques described above, as well as any other presentation form which can vary depending upon the particular communication device 116 receiving the incoming call. The present disclosure also contemplates presentation of the caller ID, the communication identifiers and/or the notification of incoming call to be done while the media program continues on the media device. In one embodiment, the caller ID and/or the communication identifiers can be presented at a device associated with the media device, such as a display on a media or remote controller of the media device, to avoid interruption of the media program.

In one embodiment, the caller ID can be associated with a called party for presentation of the communication identifier, as in step 322. For example, if a communication device 116 has multiple users, then one or more of those user's can have a phonebook stored by, or otherwise accessible by, the communication device so that a called party can be determined by associating the caller ID with an entry in a select one of the phonebooks. In another embodiment, the called party's phonebook can be utilized to provide alternative communication identifiers for forwarding the call to the called party. In yet another embodiment, the user can be presented a list of the multiple users of the communication device 116 receiving the call. The user can select one of the listed users, and the selected user's phonebook can be utilized to provide alternative communication identifiers for forwarding the call to the called party.

In one embodiment, presence information is presented to the user of the called party's communication device 116 in response to a forwarding request, as in step 324. The presence information can assist the user in determining another communication device of the called party which is likely to be answered by the called party. The presence information can be derived by numerous techniques, and can vary depending upon the particular type of communication device. For example, the network proxy 122 can monitor various communication devices 116 associated with the called party, such as a cellular phone in transit which is being detected by a series of base stations or a computer that is exhibiting network activity. Such activities, as well as others, can be indicative of use by the called party or a likelihood of success in contacting the called party.

In one embodiment, the presence information can be used to present to the user the more likely of the communication identifiers to be successful in establishing communication with the called party, such as by highlighting or otherwise indicating any communication identifiers where potential presence activity has been detected. In another embodiment, a called party's phonebook is utilized to present the one or more communication identifiers to provide alternative options to forward the call to the called party, and any of the one or more communication identifiers having a likelihood of establishing communications with the called party is highlighted or otherwise indicated based upon the presence information.

The called party's communication device 116 can also provide the forwarding information, such as the forwarding number or desired forwarding communication device, with the request to forward the call. In step 326, the network proxy 122 can determine whether the forwarding information has been provided by the called party's communication device 116. The forwarding information can be inputted into the called party's communication device 116 and/or can be stored therein or in the network proxy 122 for selection by the user. If the called party's communication device 116 has provided the forwarding information for this incoming call, then as recited back in step 314 the network proxy 122 redirects the call to the desired other communication device of the called party. If on the other hand the network proxy 122 detects in step 326 that the called party's communication device 116 has not provided the forwarding information, then the network proxy can present communication identifiers, as recited back in step 316. In one embodiment, an IMS system, as described above, comprising a Proxy Call Session Control Function (P-CSCF) can notify the called party's communication device 116 of the incoming call, supply the caller ID associated with the incoming call, and forward the call, as recited back in steps 302, 308 and 314.

From the foregoing descriptions, it would be evident to an artisan with ordinary skill in the art that the aforementioned embodiments can be modified, reduced, or enhanced without departing from the scope and spirit of the claims described below. For example, the network proxy 122 can transmit a successful communication notice to the initial communication device 116 of the called party immediately after the forwarding communication device of the called party has accepted the communication. The network proxy 122 can cycle through multiple forwarding communication devices of the called party where the forwarded call has not been accepted. These are but a few examples of the modifications that can be applied to the present disclosure without departing from the scope of the claims. Accordingly, the reader is directed to the claims for a fuller understanding of the breadth and scope of the present disclosure.

Figure 4:
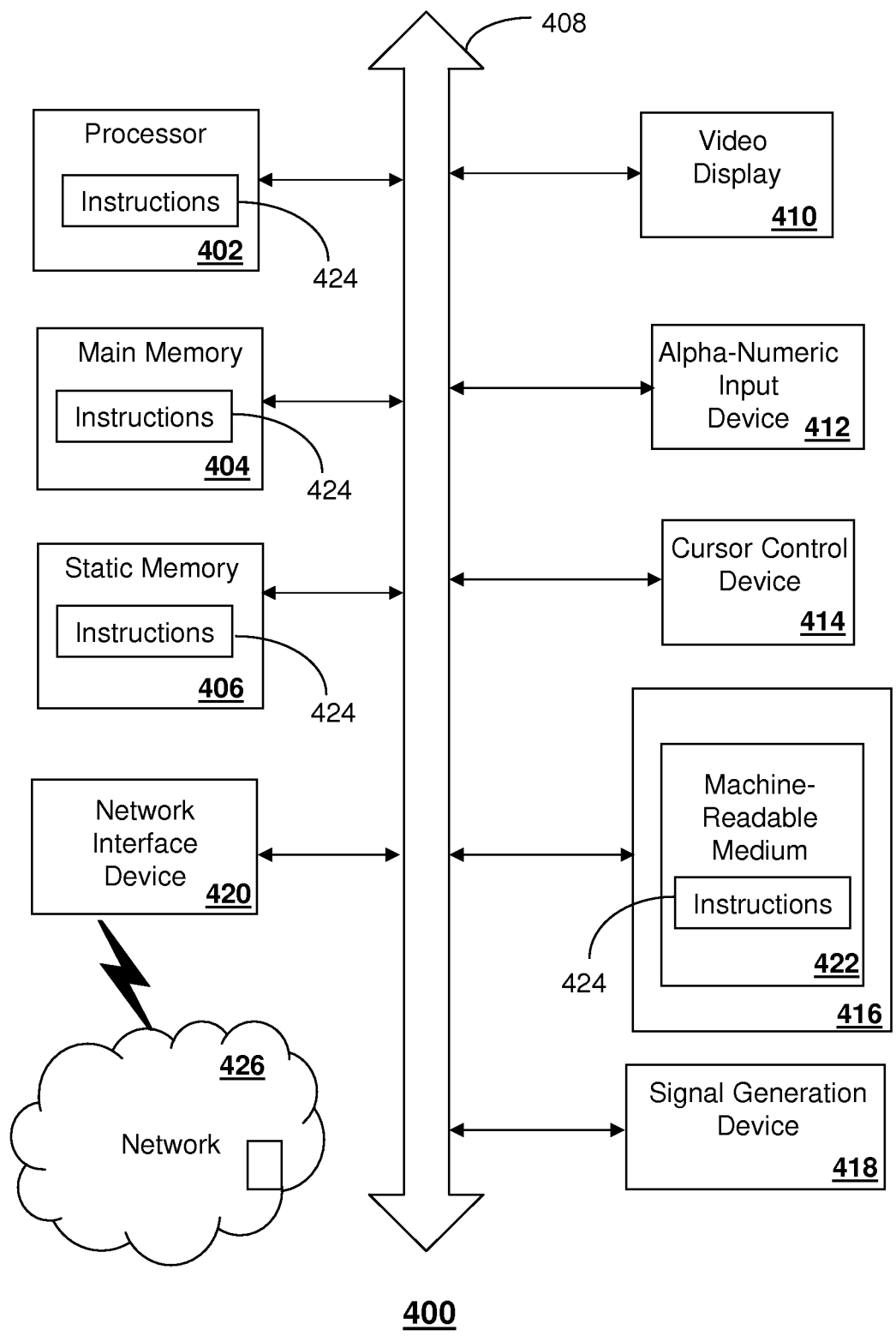
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a mass storage medium 416, a signal generation device 418 (e.g., a speaker or remote control) and a network interface device 420.

The mass storage medium 416 may include a computer-readable storage medium 422 on which is stored one or more sets of instructions (e.g., software 424) embodying any one or more of the methodologies or functions described herein, including those methods illustrated above. The computer-readable storage medium 422 can be an electromechanical medium such as a common disk drive, or a mass storage medium with no moving parts such as Flash or like non-volatile memories. The instructions 424 may also reside, completely or at least partially, within the main memory 404, the static memory 406, and/or within the processor 402 during execution thereof by the computer system 400. The main memory 404 and the processor 402 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the computer-readable storage medium 422 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
 a memory to store instructions and a plurality of phonebooks, wherein the plurality of phonebooks are respectively associated with a plurality of users that share the communication device; and
 a processor coupled to the memory, wherein responsive executing the instructions, the processor performs operations comprising:
  receiving from a communication system a notification of an incoming call initiated by a second communication device,
  wherein the communication system operates as a multimedia system, wherein the multimedia system is coupled to a television system, wherein the communication device is coupled to a media presentation device, and wherein the media presentation device comprises one of a television set, or a computer display; receiving a media program from the television system; presenting the media program at the media presentation device; pausing the media program responsive to receiving the incoming call; recording the media program from a time when the media program was paused;
  retrieving a caller identification from signaling information associated with the incoming call; presenting the caller identification at a display of a media controller managing operations of the communication device responsive to the incoming call;
  identifying a called party by associating the caller identification with an entry in a select one of the plurality of phonebooks that is associated with the called party; receiving a first request to forward the incoming call to another communication device; accessing a phonebook of the called party from the plurality of phonebooks stored in the memory; obtaining from the phonebook of the called party a plurality of communication identifiers respectively associated with devices used for communication by the called party; obtaining presence information associated with the called party;
   presenting the plurality of communication identifiers, wherein according to the presence information a communication identifier of the plurality of communication identifiers corresponds to a device used by the called party that has a greater likelihood of facilitating communications with the called party than other devices corresponding to other communication identifiers of the plurality of communication identifiers, and wherein the presentation of the communication identifier is distinct from the presentation of the other communication identifiers;
   receiving a selection of a communication identifier of the plurality of communication identifiers;
   submitting to the communication system a second request to forward the incoming call according to the communication identifier selected; and reestablishing presentation of the media program from the time the media program was paused responsive to submitting the second request.

2. The communication device of claim 1, wherein the communication device comprises one of a set-top box, a computer, a fixed communication device, a short-range portable communication device, or a cellular communication device.

3. The communication device of claim 1, wherein the operations further comprise presenting the plurality of communication identifiers by way of a display of the communication device.

4. The communication device of claim 1, wherein the incoming call corresponds to a voice over internet protocol call, and wherein the signaling information conforms to a session initiation protocol.

5. The communication device of claim 1, wherein the communication system operates as only a packet-switched network or as only a circuit-switched network and does not provide combined circuit and packet-switched operations.

6. The communication device of claim 1 wherein the plurality of communication identifiers are presented at the display of the media controller responsive to the first request.

7. The communication device of claim 1, wherein the operations further comprise:
 presenting the caller identification at the media presentation device responsive to the call; and
 presenting the plurality of communication identifiers at the media presentation device responsive to the first request.

8. The communication device of claim 1, wherein the operations further comprise:
 presenting the plurality of users; and
 receiving a second selection of a user from the plurality of users, wherein the user is the called party, wherein the phonebook of the called party is accessed responsive to the second selection of the user.

9. The communication device of claim 1, wherein the plurality of communication identifiers comprises one of an E.164 number or a session initiation protocol uniform resource identifier.

10. A network device, comprising:
 a memory to store instructions; and
 a processor coupled to the memory, wherein responsive executing the instructions, the processor performs operations comprising:
  notifying a first communication device of an incoming call, wherein the network device and the first communication device are coupled to a communication system, wherein the communication system operates as a multimedia system, wherein the multimedia system is coupled to a television system, wherein the communication device is coupled to a media presentation device, and wherein the media presentation device comprises one of a television set or a computer display;
  directing the incoming call to the first communication device, wherein responsive to receiving the incoming call, the first communication device pauses a media program being presented at the media presentation device from the television system and records the media program from a time when the media program was paused;

supplying the first communication device with a caller identification associated with the incoming call, wherein the first communication device presents the caller identification at a display of a media controller managing operations of the first communication device responsive to the incoming call;

identifying a called party by associating the caller identification with an entry in a phonebook of the called party, the phonebook being one of a plurality of phonebooks; accessing the phonebook of the called party from the plurality of phonebooks;

obtaining from the phonebook of the called party a plurality of communication identifiers respectively associated with devices used for communication by the called party;

obtaining presence information associated with the called party;

presenting at the first communication device the plurality of communication identifiers respectively associated with the devices used by the called party, wherein the presentation of one of the plurality of communication identifiers is distinct from the presentation of a remaining number of the plurality of communication identifiers and is based on the presence information;

receiving from the first communication device a request to forward the incoming call according to a selection of one communication identifier from the plurality of communication identifiers, wherein the first communication device reestablishes presentation of the media program from the time the media program was paused responsive to submitting the request; and redirecting the incoming call according to the communication identifier selected.

11. The network device of claim 10, wherein the network device comprises a proxy call session control function.

12. The network device of claim 10, wherein the first communication device comprises one of a set-top box, a computer, a fixed communication device, a short-range portable communication device, or a cellular communication device.

13. A method, comprising: receiving, by a first communication device, a notification via a communication system of an incoming call initiated by a second communication device, wherein the communication system operates as a multimedia system, wherein the multimedia system is coupled to a television system, wherein the communication device is coupled to a media presentation device, and wherein the media presentation device comprises one of a television set, or a computer display;

receiving, by the first communication device, a media program from the television system; presenting, by the first communication device, the media program at the media presentation device; pausing, by the first communication device, the media program responsive to receiving the incoming call; recording, by the first communication device, the media program from a time when the media program was paused;

presenting, by the first communication device at a display of a media controller managing operations of the first communication device responsive to the incoming call, a caller identification associated with the incoming call; identifying, by the first communication device, a called party by associating the caller identification with an entry in a phonebook of the called party, the phonebook being one of a plurality of phonebooks; accessing, by the first communication device, the phonebook of the called party from the plurality of phonebooks, wherein the plurality of phonebooks are respectively associated with a plurality of users that share the first communication device; obtaining, by the first communication device, from the phonebook of the called party a plurality of communication identifiers associated with devices used for communication by the called party; obtaining, by the first communication device, presence information associated with the called party;

presenting, by the first communication device, the plurality of communication identifiers associated with the devices used for communication by the called party, wherein one of the plurality of communication identifiers is presented distinctly from a remaining number of the plurality of communication identifiers responsive to the presence information; requesting, by the first communication device, a communication system to redirect the incoming call according to a selected one of the plurality of communication identifiers; and reestablishing, by the first communication device, presentation of the media program from the time the media program was paused responsive to the requesting.

14. The method of claim 13, comprising detecting, by the first communication device, the selection of the communication identifier to which the incoming call is to be redirected.

15. The method of claim 13, wherein the incoming call is a voice over internet protocol call.

16. The method of claim 13, wherein the method is used by one of a set-top box, a media controller that manages the set-top box, a computer, a fixed communication device, a short-range portable communication device, or a cellular communication device.

* * * * *